Patented Apr. 20, 1948

2,440,190

UNITED STATES PATENT OFFICE 2,440,190

PREPARATION OF NONPOROUS POLYTETRAFLUOROETHYLENE ARTICLES

Johannes Alfthan, New York, N. Y., assignor to E. I. du Pont de Nemours & Company, Wilmington, Del., a corporation of Delaware No Drawing. Application March 1, 1944, Serial No. 524,655

3 Claims. (Cl. 18—47.5)

This invention relates to the preparation of polytetrafluoroethylene articles and, more particularly, to a process for the manufacture of nonporous polytetrafluoroethylene sheets.

Polytetrafluoroethylene, the preparation of which is disclosed in Plunkett U. S. Patent 2,230,654, is a polymeric product highly resistant to corrosive influence and oxidation. Due to its peculiar properties, it is exceedingly valuable for the manufacture of laboratory apparatus for handling corrosive reagents, discs for goggles used in corrosive atmospheres, and similar articles, but difficulties have been encountered heretofore in fabricating this material into uniform homogeneous articles, especially those of thin section such as sheets.

An object of the present invention is to provide a process of fabricating non-porous articles from polytetrafluoroethylene. A more particular object is to provide a process of fabricating polytetrafluoroethylene sheets. Other objects will be apparent from the description of the invention given hereinafter.

The above objects are accomplished according to the present invention by forming a slurry of finely divided polytetrafluoroethylene in a liquid dispersant inert to and capable of wetting the polytetrafluoroethylene and readily vaporizable at temperatures below 327° C., sedimenting the polytetrafluoroethylene in a layer from the slurry, removing the excess liquid dispersant from the sedimented polytetrafluoroethylene, pressing said layer of sedimented polytetrafluoroethylene under pressure of at least 50 pounds per square inch, releasing the said pressure, seasoning it until it is substantially free from the liquid dispersant, and then sintering the sedimented polytetrafluoroethylene at a temperature above 327° C. A non-porous and homogeneous article is obtained by applying substantial pressure to the sedimented polytetrafluoroethylene before seasoning while an article characterized by a cellular or porous structure will result if this additional step is omitted.

The following examples in which all parts are by weight unless otherwise noted, illustrate specific embodiments of the invention:

Example I

Fifty parts of micropulverized polytetrafluoroethylene powder were mixed with 500 parts of ethyl alcohol by shaking manually in a jar. Before this slurry had settled, 100 parts of the same were poured onto a muslin filter placed in a six inch Buchner funnel. A slight vacuum was applied to this assemblage in order to draw off excess alcohol and a second piece of muslin was placed on top of the sedimented sheet. This sheet was then removed and passed through a pair of cold rolls where pressure was applied. After seasoning the pressed sheet in warm air for approximately two hours, the muslin was removed and the sheet was placed in a 380° C. oven and baked for 15 minutes. After removal from the oven, the sheet was immediately quenched in cold water (20° C.) and, thereafter, was oriented by passing through a pair of cold rolls. During this rolling operation, the thickness of the sheet was reduced from 0.016 to 0.007 inch.

Example II

Fifty parts of micropulverized polytetrafluoroethylene were slurried with 500 parts of ethyl alcohol. This slurry was passed several times through a colloid mill in order to reduce the particle size. The modified slurry was then sedimented upon a 200 mesh stainless steel screen in a manner similar to that of Example I. After filtration of the alcohol therefrom, the sedimented polymer was covered with another screen and subjected, in a platen press, to 500 lbs. per square inch pressure. The screens were stripped from the cake of pressed polymer and it was seasoned over night, then baked in a 380° C. oven as in Example I and quenched in cold water.

Example III

Two 10 x 12 inch sheets were sedimented by the procedure of Example I. After compression at 1500 lbs. per square inch the muslin covering was stripped from each sheet. These sheets were then dried for one-half hour under a heater fan. The dried sheets were placed together and pressed in a 10 x 12 inch platen press with 1500 lbs. per square inch. The united sheets were baked at 400° C. until sintered, and were then quenched. The sheets welded together well, having a total thickness of approximately 0.048 inch. These sheets were then rolled to one-half of their original thickness without delaminating.

This procedure was repeated with the exception that the sheets were joined and pressed before drying. A perfect weld was obtained.

Example IV

Micropulverized polytetrafluoroethylene powder was slurried in ethyl alcohol in the proportions of 100 parts of powder to 2000 parts of alcohol. This mixture was then passed through a 10 mesh (U. S. Standard) screen. Six hundred parts of the mixture were poured over a muslin filter, placed in a 7 inch diameter Buchner funnel. After most of the alcohol had passed therethrough, a slight vacuum was applied. Another piece of muslin was then placed over the sedimented layer and the assembly removed from the funnel. Approximately 500 pounds per square inch pressure was applied to this sample in a platen press. The muslin was stripped from the sample which was then baked for 30 minutes at 380° C. The resulting sheet was removed from the oven and allowed to cool without quenching. The sheet had a diameter of approximately 6½ inches and a thickness of approximately 0.026 inch and was cold rolled to 0.009 inch.

It will be understood that the above examples are merely illustrative and that the procedure set forth may be varied widely without departing from the scope of this invention. While the examples all show the use of polytetrafluoroethylene powder, the invention with modifications obvious to the art, is equally applicable to interpolymers of tertafluoroethylene, e. g., with ethylene, isobutylene, and the like.

The invention is shown as being carried out batchwise in the examples but the invention is also adapted to be carried out as a continuous process in which latter case the slurry of finely divided polytetrafluoroethylene may be continuously delivered to a traveling screen passing over a vacuum box to remove excess liquid dispersant and then through a pair of rollers to press the layer of polymer deposited on the screen; thereafter, the screen travels through a drier to remove substantially all remaining traces of the liquid dispersant and through a baking oven and thence into a quenching liquid. After emerging from the quenching liquid, the sintered layer of polymer may be rolled or otherwise treated in a continuous manner or it may be severed in lengths for further treatment or use.

The concentration of the slurry is largely a matter of choice for ease of handling when the invention is carried out in a batch process although, ordinarily, concentrations within the range of those given in the examples would be used. In operating continuously, it is preferred that the slurry concentration be below about 15% of polymer, by weight of the slurry, as accurate caliper control becomes difficult when the concentration of polymer substantially exceeds this limit.

It has been found that if the concentration of the polytetrafluoroethylene in the slurry is exceedingly high so that, in effect, the polymer is merely wet with the liquid ordinarily used as a dispersant in the present invention, the slurry is useful as an extrusion and molding composition. The dispersant liquid added in amounts less than 50% by weight of the whole acts as a lubricant in extruding or molding the mixture.

Ethyl alcohol was used in the examples as the liquid dispersant in which the polytetrafluoroethylene powder was slurried and ethyl alcohol is the preferred liquid dispersant although other liquids or liquid mixtures are suitable for the purpose. The essential requirements of the liquid dispersant are that it shall be inert to polytetrafluoroethylene, that it shall wet the polytetrafluoroethylene so that a dispersion is possible, and that it shall be volatile enough so as to be removed readily by vaporization at temperatures below 327° C. Among the liquid dispersants suitable for use in the present invention in addition to ethyl alcohol are: methyl alcohol, acetone, acetic acid, ethyl acetate, hexane, tetrachloroethylene, ethyl ether, pinene, triethanol amine, dibutyl phthalate, and mixtures of liquids such as ethyl alcohol and water, or ethyl acetate and hexane.

Normally, it is not preferred to add non-volatile modifiers to the liquid dispersant since their presence in the final article may detract greatly from the advantageous properties of the polymer and it usually is not economical to resort to a special operation to remove the non-volatile modifiers. However, it is possible, for example, to use water as a liquid dispersant if there is added to it a wetting agent such as a dialkyl ester of sodium sulfosuccinate. Usually, if a dispersant of this type is used, it will be necessary to wash the sediment free of wetting agent prior to continuation of the process.

It is advantageous to remove the excess liquid dispersant from the sedimented layer of polymer by the application of a vacuum and the use of this expedient obviously results in the application of some pressure to the sedimented layer. However, this pressure will never exceed prevailing atmospheric pressure and, of course, has no influence at all where a dense product is desired since the sedimented polymer will be subjected to much greater pressure in that case at any rate. The porosity of the product has been found to vary inversely with the pressure applied so that wide variations in the degree of porosity of the finished article may be attained at will. A pressure of 15 pounds per square inch will ordinarily be the highest used in the manufacture of a porous article.

When dense homogeneous articles are to be prepared by the present invention, it is necessary to subject the sedimented layer of polytetrafluoroethylene to an additional step immediately subsequent to removal of the excess liquid dispersant, such step being the application of considerable pressure to the surfaces of the sedimented layer. The pressure applied will normally be between 50 pounds to 10,000 pounds per square inch, the precise pressure used in any specific instant depending chiefly upon the size and shape of the article and the density desired and, to a much lesser extent, upon the character of the surfaces between which the sedimented layer is being pressed.

After removal of the excess liquid dispersant and the application of pressure to the sedimented layer, the sedimented polytetrafluoroethylene is subjected to a seasoning step to remove substantially all of the liquid dispersant prior to the baking step. The liquid dispersant is usually removed by subjecting the product to a temperature a few degrees below the boiling point of the liquid dispersant, circulating air generally being employed in the seasoning compartments to accelerate the seasoning. However, neither additional heat nor circulating air is necessary in the seasoning process except for the purpose of expediting it. The volatile liquid should, nevertheless, be substantially completely removed prior to the baking step.

The baking step is an essential part of the present invention and the sedimented layer or formed article should be subjected to a temperature above 327° C. until the polymer is sintered. A temperature above 350° C. will usually be employed in this baking step and the duration of the baking will vary considerably depending upon the size and shape of the article baked. Smaller articles of thin section ordinarily require less time than larger articles to be sintered although the optimum period of baking for any given article will have to be determined by experience. After the polytetrafluoroethylene has been baked, it may be further treated in any one of several ways to modify its shape or properties. Quenching of the article in a liquid directly after removal from the baking oven improves its toughness and tensile strength and quenched articles, in thin sections, are practically transparent. Rolling of sheets has been found to improve the electrical properties of the sheets, especially their dielectric strength. If close dimensional tolerances or complex shapes are desired, it has been found possible to form the finished article in a die, machined to exact dimensions by heating the article and subjecting it, while in the die, to pressures in excess of approximately 3,000 pounds per square inch. This type of treatment is practical only where there is a minimum of plastic flow in attaining the die shape as excessive plastic flow results in deterioration of the physical properties. Other methods of working, e. g., drawing, pressing, hammering, or machining by sawing, drilling, punching, shaping, milling or grinding, are after treatments for modification of polymer properties or shape or size of article which may be employed.

The polytetrafluoroethylene polymer should be finely divided in order to carry out the present invention successfully and improved results are obtained when the polymer is as finely divided as possible. This fine subdivision of the polymer can be achieved by preparing the polymer in a violently agitated system, or by subjecting the polymer to a mechanical subdividing step prior to the sedimentation, such as micropulverization. Also, it is quite practical to subject the slurry of the polymer to further treatment to reduce particle size of the dispersed polymer.

An advantage of the present invention is that the articles prepared by it are remarkably homogeneous. They have densities ranging up to 2.2. Such articles have many valuable industrial applications because of their flexibility, toughness, resistance to mechanical shock, outstanding electrical properties, and, notably, because of the polymers' unusual chemical inertness. Articles made by the present process are colorless and generally opaque, except for thin sections which have been quenched after baking.

As many apparently widely different embodiments of this invention may be made without departing from the spirit and scope thereof, it is to be understood that the invention is not limited to the specific embodiments thereof except as defined in the appended claims.

I claim:

1. Process of fabricating non-porous, homogeneous articles which comprises forming a slurry of finely divided polytetrafluoroethylene in a liquid dispersant inert to and capable of wetting said polytetrafluoroethylene and vaporizable at temperatures below 427° C., sedimenting a layer of polytetrafluoroethylene from said slurry, removing the excess liquid dispersant from said sedimented polytetrafluoroethylene, pressing said layer of sedimented polytetrafluoroethylene under a pressure of at least 50 pounds per square inch, releasing the said pressure seasoning said sedimented polytetrafluoroethylene until substantially free from said liquid dispersant, and sintering said sedimented polytetrafluoroethylene at a temperature above 327° C.

2. Process of fabricating non-porous, homogeneous articles which comprises forming a slurry of finely divided polytetrafluoroethylene in a liquid dispersant inert to and capable of wetting said polytetrafluoroethylene and vaporizable at temperatures below 327° C., sedimenting a layer of polytetrafluoroethylene from said slurry, removing the excess liquid dispersant from said sedimented polytetrafluoroethylene, pressing said layer of sedimented polytetrafluoroethylene under a pressure of at least 50 pounds per square inch, releasing the said pressure seasoning said sedimented polytetrafluoroethylene until substantially free from said liquid dispersant, sintering said sedimented polytetrafluoroethylene at a temperature above 350° C., and immediately thereafter quenching said sedimented polytetrafluoroethylene in water.

3. Process of fabricating non-porous, homogeneous articles which comprises forming a slurry of finely divided polytetrafluoroethylene in ethyl alcohol, sedimenting a layer of polytetrafluoroethylene from said slurry, removing the excess ethyl alcohol from said sedimented polytetrafluoroethylene, pressing said layer of sedimented polytetrafluoroethylene under a pressure of at least 50 pounds per square inch, releasing the said pressure seasoning said sedimented polytetrafluoroethylene until substantially free from said ethyl alcohol, and sintering said sedimented polytetrafluoroethylene at a temperature above 327° C.

JOHANNES ALFTHAN.

REFERENCES CITED

The following references are of record in the file of this patent:

UNITED STATES PATENTS

| Number | Name | Date |
| --- | --- | --- |
| 1,836,021 | Gibbons | Dec. 15, 1931 |
| 2,046,378 | Haux | July 7, 1936 |
| 2,230,654 | Plunkett | Feb. 4, 1941 |
| 2,270,075 | Miller | Jan. 13, 1942 |
| 2,333,816 | Pohle et al. | Nov. 9, 1943 |
| 2,354,744 | Dreyfus | Aug. 1, 1944 |
| 2,371,868 | Berg et al. | Mar. 20, 1945 |
| 2,392,388 | Joyce | Jan. 8, 1946 |
| 2,392,389 | Joyce | Jan. 8, 1946 |